(12) United States Patent
Watley et al.

(10) Patent No.: US 7,355,163 B2
(45) Date of Patent: Apr. 8, 2008

(54) DIRECT MEASUREMENT OF BRILLOUIN FREQUENCY IN DISTRIBUTED OPTICAL SENSING SYSTEMS

(75) Inventors: Daniel Andrew Watley, Danbury (GB); Mahmoud Farhadiroushan, Stanmore (GB); Barry John Shaw, Harlow (GB)

(73) Assignee: Sensornet Limited, London (GB)

( * ) Notice: Subject to any disclaimer, the term of this patent is extended or adjusted under 35 U.S.C. 154(b) by 23 days.

(21) Appl. No.: 11/568,344

(22) PCT Filed: Mar. 22, 2005

(86) PCT No.: PCT/GB2005/050040

§ 371 (c)(1),
(2), (4) Date: Oct. 26, 2006

(87) PCT Pub. No.: WO2005/106396

PCT Pub. Date: Nov. 10, 2005

(65) Prior Publication Data

US 2007/0171402 A1     Jul. 26, 2007

(30) Foreign Application Priority Data

May 1, 2004 (GB) ............................ 0409865.3

(51) Int. Cl.
*G01J 1/04* (2006.01)
*G01J 1/42* (2006.01)
*G01J 5/08* (2006.01)

(52) U.S. Cl. ........................ 250/227.14; 250/227.23; 385/12

(58) Field of Classification Search ........... 250/227.14, 250/227.23, 227.11, 227.18, 227.26, 573; 385/12, 14, 88, 82, 122; 398/202, 212, 214; 356/32, 33, 34, 35, 35.5, 73.1, 477
See application file for complete search history.

(56) References Cited

U.S. PATENT DOCUMENTS

| | | | |
|---|---|---|---|
| 6,380,534 B1 | 4/2002 | Farhadiroushan | |
| 2001/0050768 A1 | 12/2001 | Uchiyama | |
| 2002/0040936 A1 | 4/2002 | Clayton | |
| 2002/0041722 A1 | 4/2002 | Johnson | |

*Primary Examiner*—Davienne Monbleau
*Assistant Examiner*—Francis M LeGasse, Jr.
(74) *Attorney, Agent, or Firm*—Anthony R. Barkume, P.C.

(57) ABSTRACT

An optical sensing system uses light scattered from a sensing fibre to sense conditions along the fibre, and has a receiver with a frequency to amplitude converter to obtain a frequency of a Brillouin component of the received scattered light, to deduce the conditions. This converter can avoid time consuming scanning of frequencies to obtain the Brillouin frequency spectrum, and avoids the heavy processing load of deducing a peak or average frequency from the spectrum. The converter can be implemented in the optical domain using a grating or interferometer, or in the electrical domain using a diplexer or electrical interferometer. It can generate complementary signals, having opposite signs, a ratio of these signals representing the frequency. This can avoid sensitivity to amplitude changes in the received scattered signals and provide common mode rejection of noise.

23 Claims, 6 Drawing Sheets

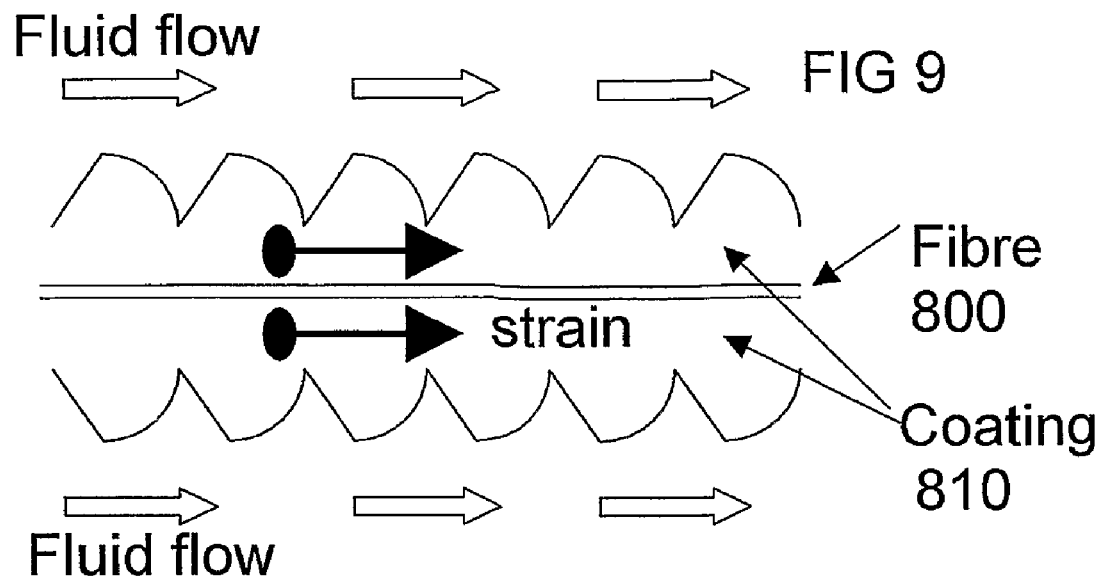
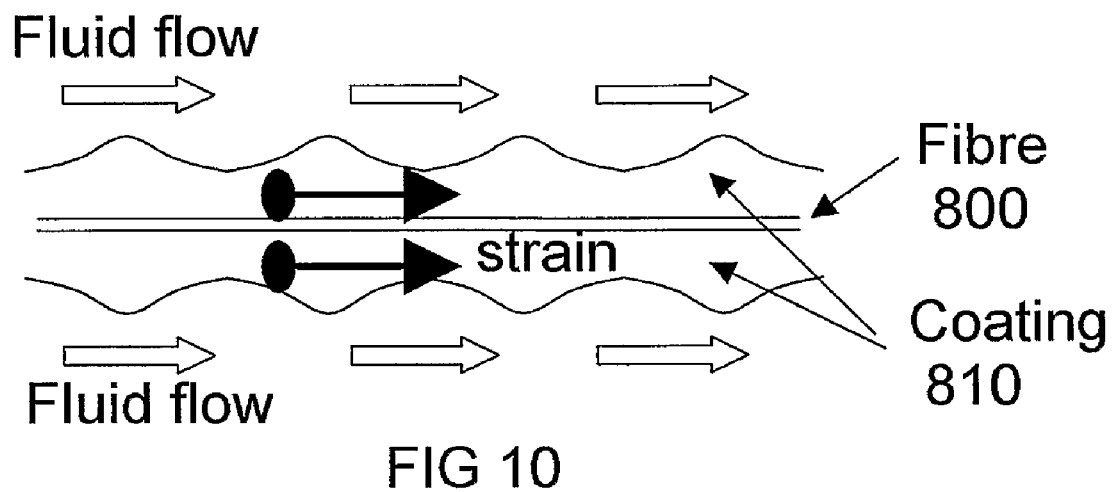

DIRECT MEASUREMENT OF BRILLOUIN FREQUENCY IN DISTRIBUTED OPTICAL SENSING SYSTEMS

FIELD OF THE INVENTION

The present invention relates to sensing systems, to receivers for such systems, to corresponding methods of sensing, methods of producing sensing signals, methods of making sensing systems and software for such methods.

BACKGROUND

There is a requirement in industry for the measurement of conditions such as strain or temperature at all points over long distances. Typical uses are for monitoring oil and gas wells, long cables and pipelines. Distributed temperature sensors often use Raman or Brillouin components of scattered light in optical fibres as the means to determine the temperature. Here, light from an optical source is launched into a fibre and the small amount of light that is scattered back towards the source is analysed. By using pulsed light and measuring the returning signal as a function of time, the backscattered light can be correlated to distance along the fibre. This backscattered light contains a component which is elastically scattered (Rayleigh light) and components that are up- and down-shifted in frequency from the source light (Raman and Brillouin anti-Stokes and Stokes light respectively, also known as inelastic scattered light). The powers of the returning Raman components are temperature dependent and so analysis of these components yields the temperature. The powers and frequency of the returning Brillouin components are strain and temperature dependent and so analysis of both components can yield temperature and strain independently.

The principles of analysing Brillouin backscatter for measuring strain and temperature has been described before, and reference is made to:

Parker, T. R., Farhadiroushan, M., Handerek, V. A., and Rogers, A. J., "Temperature and strain dependence of the power level and frequency of spontaneous Brillouin scattering in optical fibres", Optics Letters, 1 Jun. 1997, Vol. 22, No. 11, pp. 787-789 and to:

Parker, T. R., Farhadiroushan, M., Feced, R., Handerek, V. A., Rogers, A. J., "Simultaneous Distributed Measurement of Strain and Temperature from. Noise-initiated Brillouin Scattering in Optical Fibers", IEEE Journal of Quantum Electronics, April 1998, Vol. 34, No. 4, pp. 645-659.

If the frequency and power of the Brillouin backscatter can be measured then the strain and temperature in the fibre can be determined. Measuring the frequency of the backscattered light has required frequency analysis, by sweeping of a source wavelength, or a filter across the backscattered signal. From the profile of amplitudes at different wavelengths, a peak can be determined and the frequency of the peak, or the average frequency of the profile determined. It is known that the frequency analysis can be conducted in either the optical or electrical domain. The sweeping process can take some time especially since the signal under study is extremely noisy in nature.

As the fibre length increases, the accuracy of the temperature and strain measurements reduces. One reason is because the overall loss over the length of the fibre increases and so the signal returning from the far end is smaller and, as a consequence, noisier. One way to reduce the errors caused by noise is to take an average of many measurements using many pulses. The amount of such averaging can be limited by the maximum pulse repetition rate. This rate is usually limited by the fact that it is normally only possible to usefully have one pulse in the fibre at any time as otherwise it would not be possible to determine where the returning signal was generated (the backscattered signals from the multiple pulses would overlap). As the time for a light pulse to travel along a fibre is proportional to the length of the fibre thus the maximum pulse repetition rate decreases as the length of the fibre is increased. Hence accuracy drops as the sensing length is increased. As discussed above, one measurement of frequency may need many pulses, (typically hundreds) and so the effective measurement repetition rate is many times lower (perhaps hundreds of times lower) than the maximum pulse repetition rate.

An example of this is shown in U.S. Pat. No. 6,380,534, assigned to Sensornet. A narrow band Fabry Perot filter is swept across the spectrum to pass different wavelengths at different times to provide a profile of power at different wavelengths. The optical filter is scanned at a slower rate compared to the pulse repetition rate of the source. This allows the backscattered light to be captured at different selected wavelengths by sending many optical pulses during one scan cycle. The backscattered traces are combined to construct the full spectral response of the backscattered light along the sensing fibre. Each spectral response, corresponding to a different section of fibre, is normalised with reference to its Rayleigh peak which is insensitive to temperature and strain. The measurements are calibrated with respect to the spectral response of a reference section, of known temperature and strain, and the strain and temperature distribution along the sensing fibre are computed by measuring the relative amplitude and position of Brillouin peaks.

Another known example shown in a paper by Kee, H. H., Lees, G. P., and Newson, T. P., "Low loss, low cost spontaneous Brillouin-based system for simultaneous distributed strain and temperature sensing", CLEO 2000, CTh14, San Fransisco, May 2000, uses an interferometer for distinguishing the Brillouin component, and a second interferometer for determining the frequency. This uses a two step process using two pulses at different optical source wavelengths to calculate a single frequency value. This is then repeated to enable averaging. A disadvantage of this is the time required to change the optical source wavelength between different positions. This in turn can introduce frequency errors depending on the accuracy and repeatability of the optical source wavelength tuning. Another known example shown in Muaghan, S. M., Kee, H. H., and Newson, T. P., "Simultaneous distributed fibre temperature and strain sensor using microwave coherent detection of spontaneous Brillouin backscatter", Measurement Science and Technology, Vol. 12, 2001, pp. 834-842, uses coherent detection to convert to the electrical domain. The electrical signal is analysed using an electrical spectrum analyser to determine the frequency of the Brillouin components. The electrical spectrum analyser relies on mixing the received optical signal with a local RF oscillator, and sweeping the frequency of this oscillator to determine the spectrum of the received signal. Once again this method requires frequency sweeping of a source, this time an RF oscillator, which reduces the achievable measurement speed.

SUMMARY OF THE INVENTION

It is an object of the present invention to provide improved apparatus and methods. According to a first aspect of the invention, there is provided: a receiver for an optical sensing system, the system being arranged to send light along a sensing waveguide, and use light scattered from the sensing waveguide to sense conditions, the receiver being arranged to receive the scattered light, and obtain a frequency of a Brillouin component of the received scattered light, the receiver having a frequency to amplitude converter arranged to convert a received signal directly into a signal whose amplitude varies with the instantaneous frequency of the Brillouin component, for use in sensing the conditions.

By using such a converter, there is no longer a need for time consuming spectrum analysis to obtain the Brillouin frequency. Avoiding such spectrum analysis avoids the time consuming scanning of frequencies to obtain the spectrum, and avoids the heavy processing load of deducing a peak or average frequency from the spectrum. In some cases this can improve measurement rates by factors of 10s or even 100s. Consequences of such faster measurement include enabling more samples to be included in averaging. As sensing accuracy typically varies according to a square root of the number of samples being averaged, this can give a significant increase in accuracy. More rapid changes in the conditions being sensed can be detected. Useful information can be derived from a spectrum of frequencies of changes in strain, and the faster measurement can enable a wider spectrum to be measured, into the domain of acoustic analysis. The faster measurement can be traded for other advantages such as greater reach, or greater spatial resolution, for a given level of noise. The Brillouin frequency can be used to sense strain for example, or to correct sensing of other conditions such as temperature. It can be combined with other techniques to increase the flexibility of the sensing, to give fine sensing over a small range or coarse sensing over a wide range for example. In principle, these advantages can apply regardless of whether the converter is implemented in the optical domain or electrical domain. Similarly, in principle, the advantages can apply whether the Brillouin component is distinguished from other components of the scattered light, before or after the converter. They can apply to a system which sends pulses or a continuous illumination.

Additional features for dependent claims include the converter being arranged to generate complementary signals, having opposite signs and output a ratio of these signals. This enables the converter to have little or no sensitivity to amplitude changes in the received scattered signals. Thus accuracy can be improved, or the system made simpler if such amplitude sensitivities need little or no correction downstream. Furthermore, since most noise is usually amplitude noise rather than frequency noise, by taking a ratio, there is good common mode rejection of such noise, hence again sensing accuracy can be improved.

As another additional feature, the converter comprises an electrical domain frequency to amplitude converter.

Advantages of electrical domain conversion include possibilities for higher levels of integration and the use of electronics to conduct further signal processing, saving computation time. They can be combined more easily with devices giving a variable frequency offset to enable the measurement range to be moved over a wide range of frequency as desired.

Another such additional feature is the receiver comprising a coherent detector for converting the received scattered light into electrical form for the electrical domain converter. This enables optical phase information to be preserved. Coherent detectors can provide some gain, increasing the signal to noise ratio of the detected signal. This can enable the detector to use less expensive components, such as a fast PIN instead of the more expensive avalanche photodiode APD.

Another such additional feature is the converter comprising an electrical diplexer. An advantage of such converters is that they can be tailored to different frequency ranges, and it can be easier to design the converter characteristics such as the roll off to give a desired sensitivity. They can be made variable so that the range and sensitivity of the conversion can be actively selected or controlled in use.

Another such additional feature is the converter comprising an electrical interferometer. An advantage of this is that it can be made highly sensitive to small frequency changes. A drawback is that offset can be difficult to design or calibrate, but this is not an issue for some applications that need sense only relative changes in frequency, rather than absolute values. Such applications can include acoustic sensing or noise logging.

Another such additional feature is the frequency to amplitude converter comprising an optical domain frequency to amplitude converter.

Compared to electrical domain conversion, this can be implemented with fewer components and less costly components, with less risk of introducing noise.

Another such additional feature is the receiver having an optical filter before the converter, for separating one or more of the Brillouin components.

An advantage of this is that it can be simpler to implement than post filtering, and can avoid interference in some types of converters, from other parts of the received scattered light.

Another such additional feature is the converter having an optical grating arranged such that a ratio of signals reflected and passed by the grating is determined. Advantages of such devices include simplicity and reliability, no polarisation sensitivity, and lower loss than interferometric devices. Also, the system can be arranged so that an offset for the frequency measurement can be changed by a change in wavelength of the light sent along the waveguide.

Another such additional feature is the converter having an interferometric device. These can have greater sensitivity to small changes in frequency than other optical devices.

Another such additional feature is the interferometric device having an interferometer and a 3×3 coupler, the converter being arranged to compare the outputs of the coupler to obtain the frequency.

Another such additional feature is the interferometric device having a Fabry perot device. An advantage of this is greater range of operation than Mach Zehnder devices, though less sensitivity. They can be easier to set up and tune, and easier to define their offset.

Another such additional feature is the receiver being for use with a system arranged to send light at multiple wavelengths, the receiver being arranged to receive and distinguish scattered light from the different wavelengths, and derive multiple measurements of frequency simultaneously. An advantage of this is that the rate of measurements can be further increased, giving a corresponding increase in accuracy. In principle, polarisation multiplexing could be carried out as well, or instead, though at the cost of more complex and expensive optical components. Different wavelengths can be arranged to have different measurement ranges and/or different sensitivities.

Another such additional feature is a distributed sensing system, the receiver having an arrangement for determining which part of the waveguide the scattered light originated. This can use OTDR (Optical time domain reflectometry) or OFDR (Optical frequency domain reflectometry) techniques for example. This can involve the transmitter sending pulses at given times, or varying the sending wavelengths for example. A timing or frequency and time reference can be coupled from the transmitter to the receiver.

Another such additional feature is a reference section of waveguide maintained in controlled conditions, for calibrating the sensing. This can improve accuracy in absolute terms.

Another such additional feature is circuitry for determining an average of a number of frequency measurements. This can improve accuracy by reducing the effects of noise Another such additional feature is the converter having a controllable offset.

This can enable flexibility in frequency measurement, to provide sensitive measurement over a small range, and be able to move that range as desired.

Another aspect of the invention provides a sensing system comprising a transmitter, and a receiver as set out above.

Another additional feature is the system comprising the sensing waveguide, the waveguide having a sensor for converting a measurand into a strain along the waveguide, the receiver being arranged to sense the strain and deduce the measurand from the strain.

This is useful to enable any of a variety of measurements of conditions to be sensed by the same receiver. This can save equipment costs and installation costs. The measurand is defined as any measurement relating to the conditions, or any other information.

Another such additional feature is the sensor comprising a flow rate sensor being distributed along the sensing waveguide, and the receiver being arranged to sense strain and thus sense flow rate at different parts of the sensing waveguide.

This is one particularly valuable type of measurement for applications such as oil and gas production rate monitoring.

Another such additional feature is the flow rate sensor comprising a coating on the waveguide for creating drag when the waveguide is immersed in the fluid flow.

This is a particularly effective way of achieving such distributed measurements. It can be easier to implement and more rugged than alternatives such as discrete point sensors such as micro benders fitted along the waveguide. There is no need to predetermine the location of sensors. The distributed nature can give more information than point sensors, enabling tracking of anomalies as they propagate along a pipe for example, or precise detection of leaks for example.

Another aspect of the invention provides an optical sensing system having a transmitter, a receiver, and a sensing waveguide, the transmitter being arranged to send light along the sensing waveguide, the receiver being arranged to use light scattered from the sensing waveguide to sense strain at any part of the sensing waveguide, the sensing waveguide having a coating to cause drag in a fluid flow and cause local strain in the sensing waveguide, the receiver being arranged to sense the local strain and deduce a flow rate at different points along the waveguide.

This reflects that such coatings can be useful regardless of how the receiver senses the strain.

Another aspect of the invention provides a method of producing sensing signals relating to conditions along a sensing waveguide, using light sent along the sensing waveguide, the method having the steps of receiving light scattered from the sensing waveguide, obtaining a frequency of a Brillouin component of the received scattered light, using a frequency to amplitude converter to convert a received signal directly into a converted signal whose amplitude varies with the instantaneous frequency of the Brillouin component, and produce the sensing signals according to the converted signal.

Another aspect of the invention provides a method of offering a sensing service using the apparatus or method set out above, Another aspect of the invention provides software for carrying out the method.

Other advantages will be apparent to those skilled in the art, especially in relation to other prior art not known to the inventors. Any of the additional features can be combined together and combined with any of the aspects, as would be apparent to those skilled in the art.

BRIEF DESCRIPTION OF THE DRAWINGS

Embodiments of the invention and how to put it into practice are described by way of example with reference to the accompanying drawings in which:

FIGS. 9 and 10 show a sensing waveguide for converting flow rate into strain for measurement.

DETAILED DESCRIPTION

The embodiments described use an optical or electrical arrangement, with static characteristics, to directly translate the Brillouin backscatter spectrum into measures of frequency and power, from which temperature and strain can be calculated. One significant difference is dispensing with the need to acquire a detailed picture of the Brillouin spectrum. This can provide a significant increase in measurement speed since the Brillouin spectrum no longer needs to be captured through the frequency sweeping of an optical or electrical element. This technique can be coupled with the optical time domain reflectometry technique of launching a single pulse and time resolving the backscatter to provide fully distributed measures of temperature and strain in a fibre.

The use of a reference section of fibre, as has been described in earlier Sensornet U.S. Pat. No. 6,380534, is one way of allowing this technique to be self calibrating, and provide simultaneous measures of both power and frequency. Several techniques can make it possible to determine the Brillouin frequency more rapidly (in the order of several Hz or more, as will be described below). Two possible measurement regimes for which this is useful are as follows:

a) Dynamic Strain: Looking for rapid changes in strain (of the order of 10 Hz) but reasonably large strains, maybe 100 ue or more.

b) Acoustic Sensing: Looking for extremely rapid changes in strain (of the order of hundreds of Hz) and very small magnitudes of strain. In some cases there is no need for an absolute value, only an indication how much change has taken place.

One useful feature of all described techniques is to be able to detect the signals simultaneously. In other words, multi channel data acquisition will be useful to give improved performance.

FIG. 1

Figure 1:
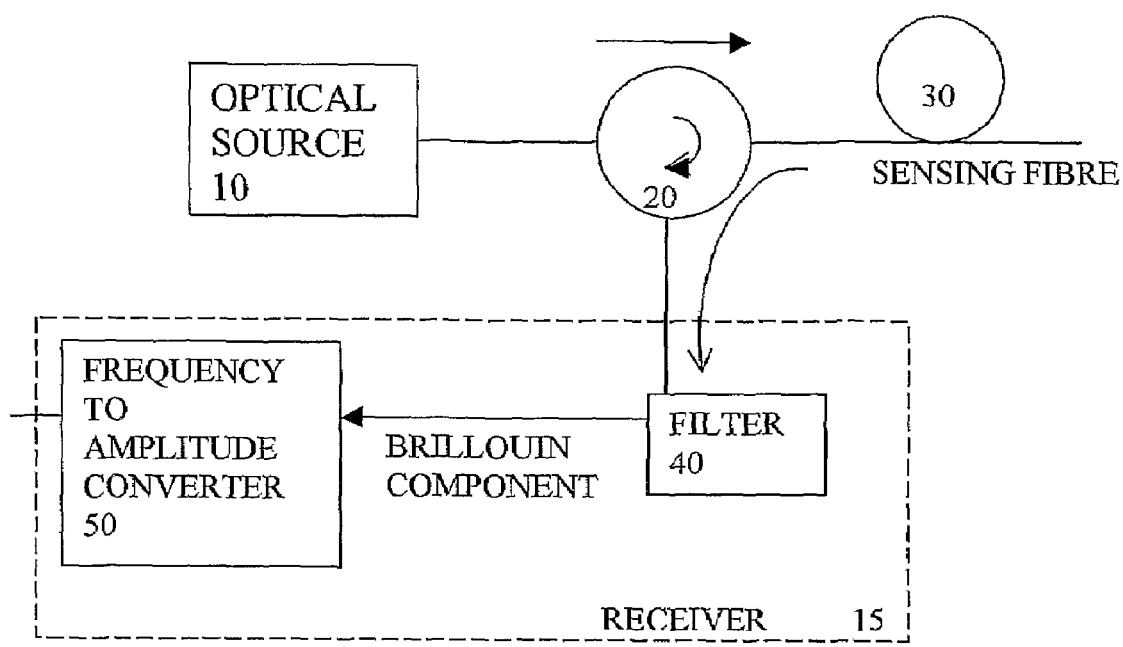
FIG. 1 shows an embodiment of the invention including a sensing system having a receiver.

FIG. 1 shows an embodiment of the invention. A transmitting means in the form of an optical source 10 is coupled to a sensing fibre 30 and sends pulses along the fibre at $\lambda_1$. The backscatter from all points of the sensing fibre is separated by circulator 20 from the forward going light using conventional techniques, and fed to a receiver 15. This backscatter has Brillouin Stokes, Raman Stokes, Raman anti Stokes, Brillouin anti Stokes and Rayleigh components derived from forward going wavelength $\lambda_1$.

The receiver has an overall purpose of outputting a sensed value or values of the conditions along the sensing fibre 30 derived from the backscattered signal. This can encompass either the conditions at different parts of the fibre, in a distributed sensing system, or along the entire sensing fibre. This involves distinguishing the useful parts of the backscatter light and calculating the sensed value. In the example shown, there is an optical receiver with a filter 40 for separating the desired backscatter components from other unwanted backscatter. A frequency to amplitude converter 50 is used to output a value which represents the Brillouin frequency, and therefore indicates strain.

Three categories of embodiments will now be described:

1. Monotonic Optical Frequency/Wavelength Discriminator.

This technique uses an optical filtering function to translate frequency shift into amplitude change, removing the need to sweep a filter and obtain a detailed optical spectrum. Specifically, an optical filter can be used that is both transmissive and reflective, where the reflected power is the complement of the transmitted power. In other words the filtered power is not absorbed but reflected. This allows changes in amplitude due to power fluctuations to be accommodated without interpretation as frequency shifts. This can reduce errors from longer term variations such as temperature changes, and from higher frequency variations such as amplitude noise.

One particular technology involves a fibre bragg grating (An alternative is to use a Fabry Perot etalon). A detector would be placed on each of the transmitted and reflected paths, as shown in FIG. 2.

Figure 2:
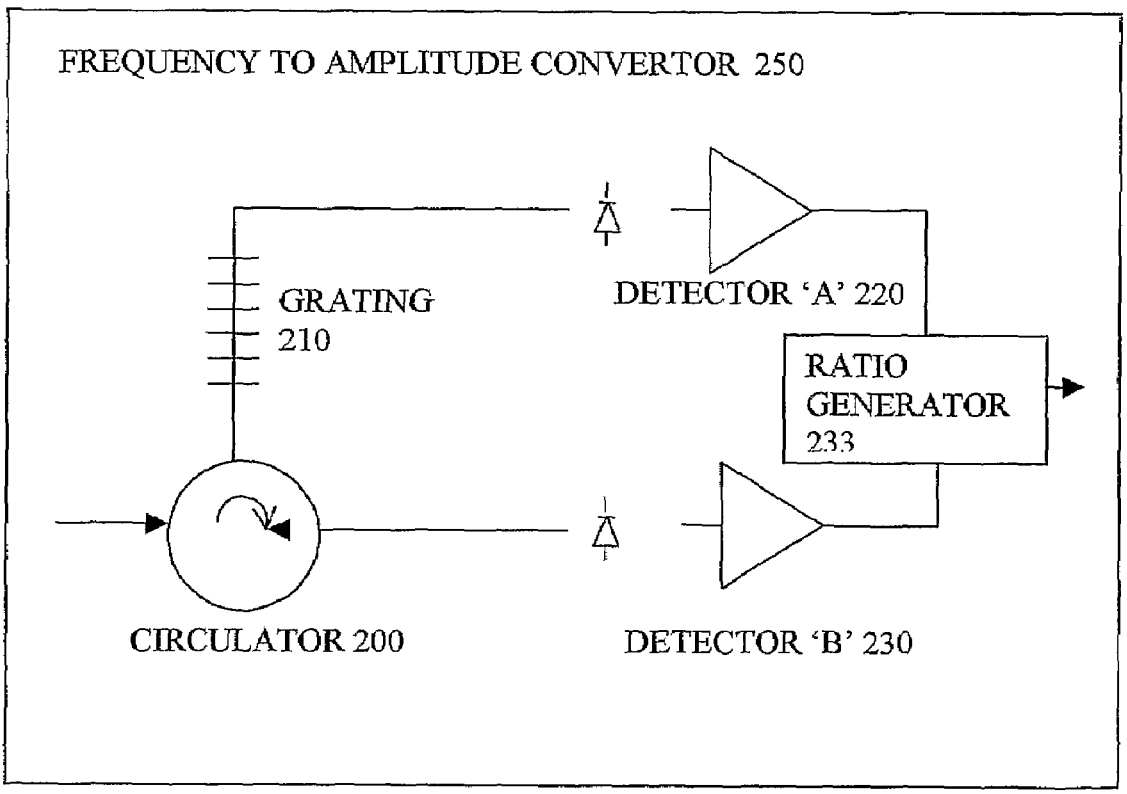
FIG. 2 shows an embodiment of an optical domain converter using a grating.

FIG. 2, Converter Using a Grating

The converter includes a circulator 200, a grating, and detectors 220 and 230 for detecting the light transmitted and reflected respectively from the grating. Circuitry 233 is provided for determining the ratio of the transmitted and reflected light. Optionally there is also circuitry (not shown) for determining simultaneously the sum of the reflected and transmitted light. Each of these components can be implemented using conventional hardware. The ratio of the detected powers would provide a measure of frequency, whilst the combined magnitude of the detected powers would provide a measure of total received power. By looking at the combined power and the ratio of the powers, both Brillouin power and frequency can be determined, and hence both temperature and strain determined. The optical filter 40 serves to isolate a single spectral component to analyse i.e. Brillouin backscatter in standard singlemode fibre. If there are multiple Brillouin frequencies as sometimes seen from dispersion shifted fibres or similar, the ratio will give an average of the frequencies. Another possible measurement would be of the Rayleigh backscatter to normalise the Brillouin power against fibre losses. The circuitry 233 can be implemented in conventional electrical analogue signal processing hardware, or in software running on conventional processor circuitry using discrete components or application specific integrated circuitry. Other types of filter having complementary outputs can substitute for the grating.

Figure 3:
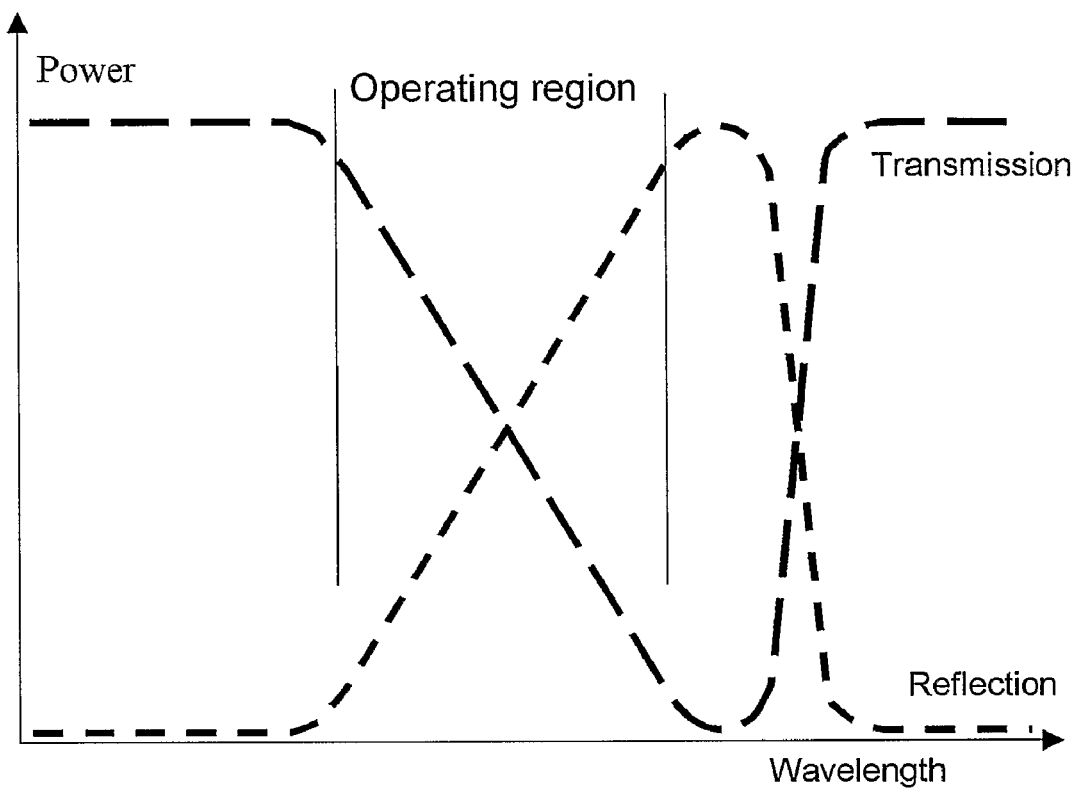
FIG. 3 shows a graph of a response of the converter of FIG. 2.

FIG. 3, Grating Response

Design parameters of the required filter response of the grating can be determined by defining the required strain measurement range. This in turn will give an indication of the strain resolution possible, given known levels of power measurement accuracy. The ideal grating for this purpose would have a perfectly linear response. In reality this is unlikely and hence accurate calibration of the filter will also be required. The response shown in FIG. 3 differs somewhat from the response of a standard bandpass/bandstop grating. If the grating is chirped and the strength of the grating is varied along its length the response shown in FIG. 3 can be achieved, this can give a wider and more linear operating range. FIG. 3 shows how the transmitted and reflected outputs vary with wavelength. In each case there is a peak and corresponding trough. The slopes at either side can be exploited as the operating region. The more gentle the slope, the less sensitive is the measurement of Brillouin frequency, and the greater is the range of measurement. To provide a variable offset, to move the range, the optical frequency of the source can be varied.

Other features of the system can include a reference fibre section of known temperature and strain, upon which all other readings can be calibrated. The sensing system can be a distributed sensing system. Time domain reflectometry is being used to look at the reference section and the distributed sensing medium, all at the same time. An optical wavelength discriminator is not new in itself The use of an etalon as a wavelength locker for stabilising lasers is known. In general this will usually use two filters/etalons and combine the detected the power from each in a similar manner as described so far. The application is specifically associated with tuning the wavelength of a laser. U.S. Pat. No. 5,798,859 to Colbourne does include provision for a single filter used in transmission and reflection mode. The reader is referred to such documents for more details of implementation.

2. Interferometric Optical Frequency/Wavelength Discriminator

Figure 4:
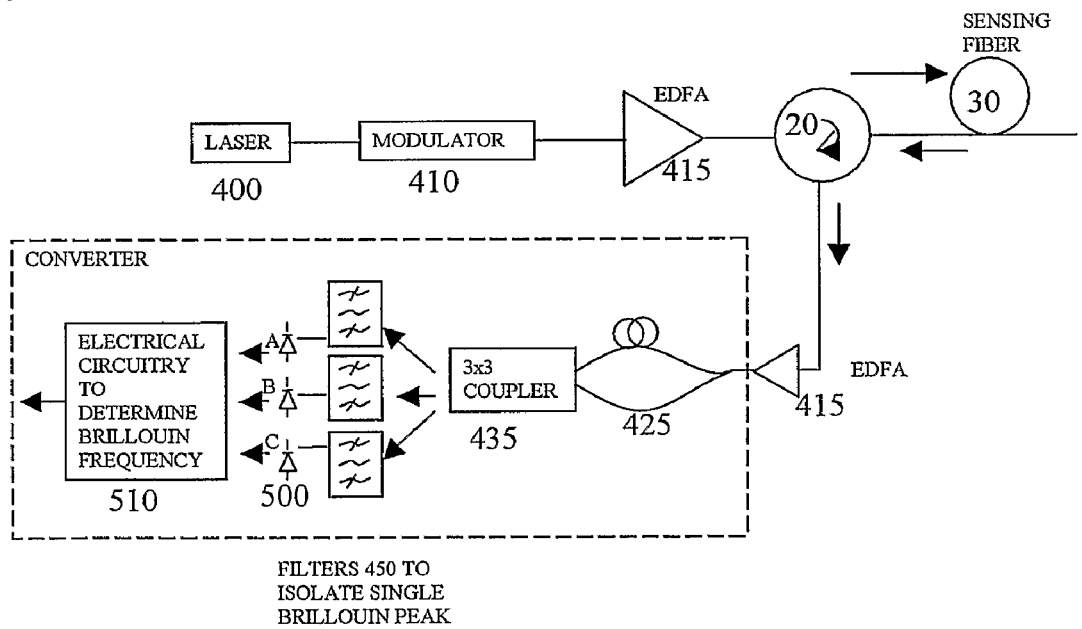
FIG. 4 shows an embodiment showing a system with a receiver having an interferometer and coupler.

FIG. 4 shows an example of a system having a receiver with a converter having an interferometer. The system includes an optical source in the form of a laser 400 and pulse modulator 410. An optical amplifier such as an EDFA (Erbium doped Fibre Amplifier) 415 can optionally be included to control the output power level. As in FIG. 1, a circulator and sensing fibre 30 are shown. The received scattered light is directed by the circulator to the receiver which in this example includes an EDFA 425 for increasing optical power to improve the signal to noise ratio.

Figure 8:
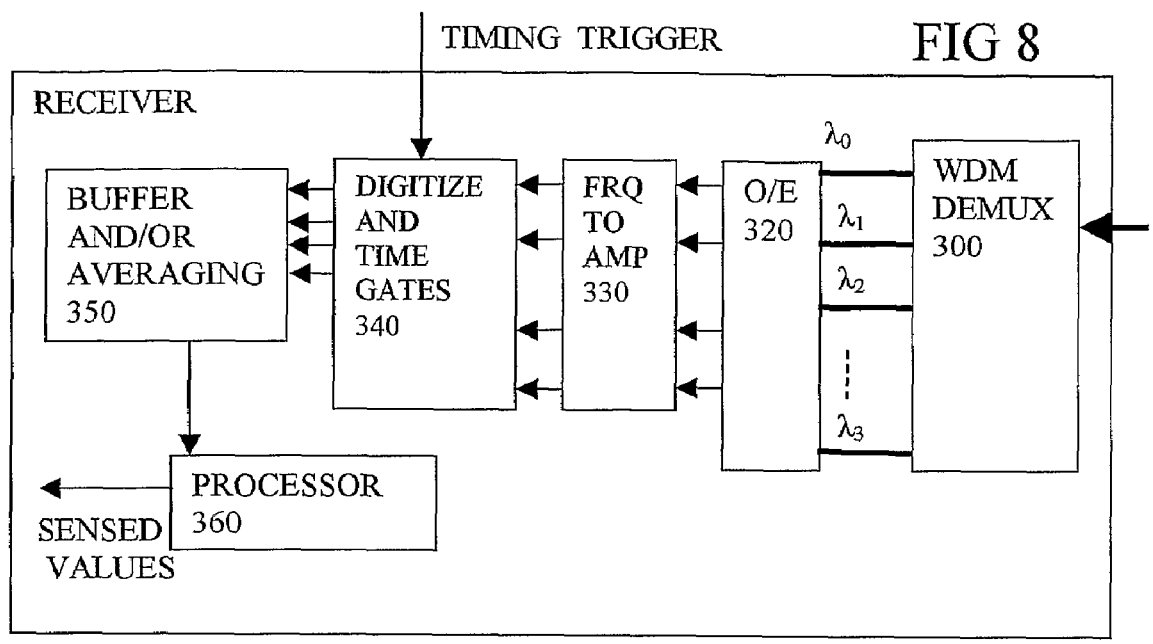
FIG. 8 shows an embodiment using multiple wavelengths.

The converter uses a Mach Zehnder interferometer 425 coupled to a 3×3 coupler 435. The three outputs A,B,C are filtered by optical filters 450 to isolate a Brillouin component. Optionally this may be carried out before the interferometer of the converter. If a WDM demultiplexer is used, as shown in FIG. 8, this function can be combined with the filtering, and Rayleigh components can be separated as well if desired. Then the three outputs are compared to each other to determine changes in the frequency. This part is conveniently carried out in the electrical domain. Detectors 500 are provided for conversion to electrical signals. Electrical circuitry 510 is provided for carrying out the comparison, and output a signal representing Brillouin frequency. This electrical circuity can be can be implemented using conventional analog or digital signal processing circuitry, or in software running on conventional processing hardware. Averaging of the value can also be implemented here, and any further processing to calibrate or correct the output can also be carried out here.

This technique is based on a Mach Zehnder interferometer with a path length difference between the arms. It has the potential to measure very small changes, such as nano strain. This will now be explained in more detail The Brillouin frequency shifts with strain and temperature as follows $\Delta f = 1$ MHz/1° C.

$\Delta f = 1$ MHz/20 µε

Brillouin shift=10.8 GHz at 1550 nm
Spatial resolution δz=1 m
Pulse width τ=10 nsec
Sampling time s=10 nsec The frequency measurement uses a path imbalance interferometer that is matched to the coherence and temporal properties of Brillouin scatter light. Consider a Mach-Zehnder interferometer with 1 m path length difference between the two arms and with two outputs that are in phase quadrature with respect to each other, such as using a 3×3 coupler at the output of a fibre interferometer.

Note that the backscatter light can all pass through the interferometer and then the Stokes, Rayleigh and anti-Stokes components can be selected or filtered. The Rayleigh does not change in frequency and this component can be used to continuously monitor the input light frequency to bias the interferometer.

Also, the Stoke shifts down in frequency whereas the anti-Stokes shifts up. Therefore, the phase of the Stokes signal passing through the interferometer decreases whereas the phase of the anti-Stokes increases. The Rayleigh frequency does not change relative to the input light and, therefore, the Rayleigh can be used as a reference phase signal. This can be used in continuous mode of operation averaged over the whole length of the fibre.

Note that the Stoke and anti-Stokes signal may vary non-linearly. Also, the noise characteristic of the Rayleigh signal is different to that of the Stokes signal. Rayleigh suffers from coherent noise but Stokes signals obey thermal noise characteristics. The optical phase difference is given by $$\phi = \frac{2\pi}{\lambda} \cdot L \cdot n \text{ or } \phi = \frac{2\pi}{c} f \cdot L \cdot n \quad (1)$$

Assuming λ=1550 nm, L=1 m and n=1.45
Then Φ=2π0.935484 approximately $10^6$ fringes.

The phase sensitivity δΦ with respect to frequency shift Δf can be calculated using equation (1)

$$\delta\phi = \frac{2\pi}{c} \delta f \cdot L \cdot n \quad (2)$$

Assuming a phase sensitivity of $10^{-4}$ rad, for example using a quadrature phase detection, the frequency resolution equates to $$\delta f = 3 \text{ kHz} \quad (3)$$

Given the Brillouin frequency shift is 1 MHz/° C. and 1 MHz/20 µε, the frequency resolution equates to temperature and strain sensitivity of 3m° K. and 60 nε

The phase can be simply resolved by measuring the signal intensity in the different arms of the 3×3 coupler and using these quantities with arctangent maths to turn it into a phase difference.

The phase may be determined with no ambiguity over 2π radians. This corresponds to a frequency shift of about 200 MHz or 4000 µε.

The phase difference between the arms of the 3×3 coupler is ideally 90° to keep the maths simple, but it is also possible to use other values, assuming the phase difference between the arms is equal and using all three arms.

The temperature variations of the receiver interferometer would introduce phase noise therefore it will be necessary to temperature control the interferometer to minimise the phase noise. Rayleigh light received from the whole length or a section of fibre can be used to lock or track the position of the fringes. In addition, backscatter light from a reference section of fibre can be used to bias the receive interferometer and calibrate the sensitivity of the fibre.

Note that the phase of the Stokes and the anti-Stokes varies in opposite directions. However, the phase through the common receiver interferometer path varies in the same direction. Therefore, the phase output of the Stokes and anti-Stokes can be subtracted to cancel the common noise.

The Stokes and anti-Stokes signals are separated by about 22 GHz. This corresponds to a fringe separation of about 100 fringes. The low frequency or DC strain may be deduced by measuring the phase difference between the Stokes and anti-Stokes and comparing their relative phases (Two-frequency fringe positioning).

Several papers and patents such as U.S. Pat. No. 6,674,928 show the use of an interferometer and 3×3 couplers for frequency measurements, all relating specifically to measuring the wavelength shift of FBG's.

Polarisation sensitivity of the interferometer can be handled by use of polarisation maintaining components.

3. Electrical Frequency Discriminator

Figure 5:
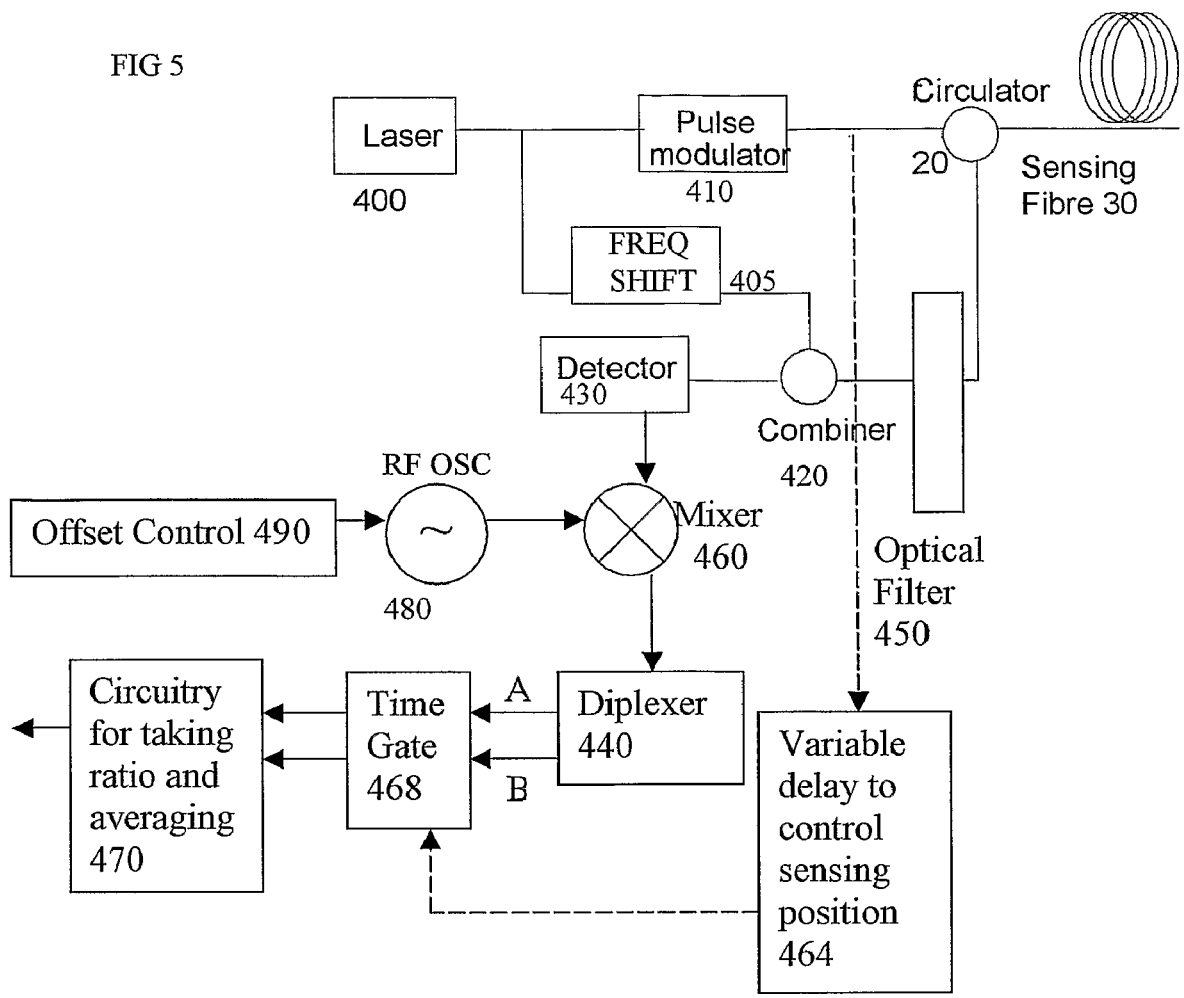
FIG. 5 shows an embodiment showing an electrical domain converter.

This is a direct equivalent of the previously mentioned techniques, except now the frequency to amplitude conversion is carried out in the electrical domain using a diplexer. FIG. 5 shows a system using such a diplexer in the converter. Diplexers are a common component, especially amongst satellite TV receivers etc. They provide frequency to amplitude conversion like the optical filters discussed earlier. They can once again be considered as a filter, where the complement of the filter response is also available. So when a signal frequency falls on the edges of these filters, their amplitude will change with frequency. Looking at the ratio of the two signal powers, A & B provides a measure of electrical frequency. Importantly this is done in a single step without the need to sweep a local electrical oscillator as is the case in an electrical spectrum analyser. Once again this enables high acquisition rates necessary for applications such as investigation of dynamic strains.

The system includes an optical source in the form of a laser 400 and pulse modulator 410. An optical amplifier such as an EDFA (Erbium doped Fibre Amplifier) can optionally be included to control the output power level (not shown). As in FIG. 1, a circulator and sensing fibre 30 are shown. In the receive path there can be an EDFA (not shown), an optical filter 450, for isolating a Brillouin component, and a coherent detector. This coherent detector has a combiner 420, for combining a reference optical source such as the continuous wave output of the laser, followed by a detector 430, for converting to electrical form. As the combining gives some coherent gain, a less sensitive detector can be used. In a typical example, this can be implemented by a 12 GHz PIN detector. An optional feature is a frequency shifter 405 for shifting the wavelength of the light from the laser before input to the combiner. The purpose of this is to differentiate the offsets of the two Brillouin components output by the combiner. Instead of their offsets being say + and −10 GHz, they can be made say +9 and −11 GHz. This means the two components no longer overlap at the detector, and can be processed separately thereafter if desired.

The electrical signal is optionally down converted to a lower frequency for convenience of processing. This can be carried out by a mixer 460, fed by an RF oscillator 480. This can also serve the purpose of altering the offset of the frequency measurement, if the RF oscillator frequency can be varied by an offset controller 490. The down converted signal which can be for example around 500 MHz, is fed to the diplexer 440. The diplexer carries out the frequency to amplitude conversion, and a ratio of outputs A and B represents the frequency. Following this, time gating can be carried out by element 468, if it is desired to measure at a particular part of the sensing fibre. The timing of the gating can be controlled by a variable delay 464 fed by a synchronising pulse from the transmitting side. Finally, circuitry 470 is provided for taking a ratio and averaging the values, and carrying out any other calibration or correction. Again this circuitry can be implemented in conventional analogue or digital circuitry, or in software running on conventional processing hardware.

The use of a reference section of fibre in a system is one way of enabling calibration of the diplexer outputs. The diplexer can be custom designed and built to provide the required frequency/amplitude slope for a desired strain range. Signal quality should also be enhanced by the coherent detection which is used. As with the optical filter technique, careful prior calibration of the diplexer characteristics will be required when first constructing a unit.

Figure 6:
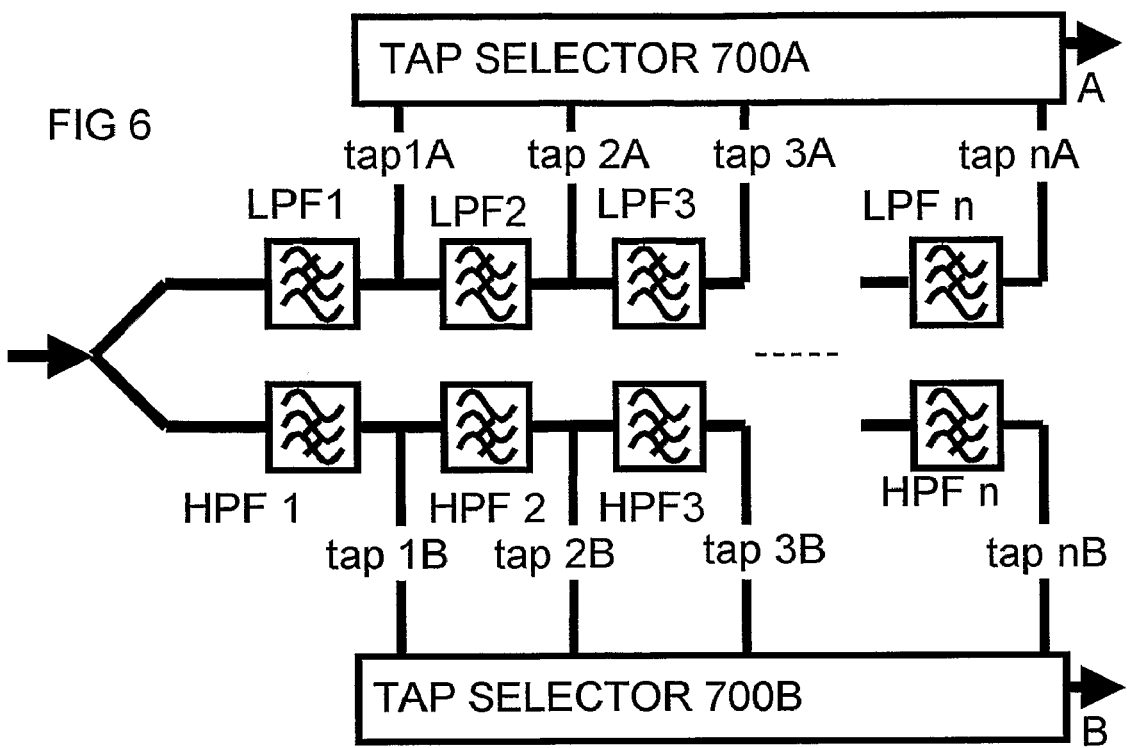
FIG. 6 shows an embodiment showing a variable diplexer.

FIG. 6 Variable Diplexer

FIG. 6 shows a diplexer structure for use in the embodiment of FIG. 5 or in other embodiments. In this case, it can be made to have a variable roll off and therefore variable sensitivity and variable range of measurement. This is achieved by providing a number of taps and selecting which taps are used for the complementary signals. The structure comprises two lines of series coupled filters. A first of the lines comprises low pass filters LPF1-LPFn. A second line comprises high pass filters HPF1-HPFn. Taps can be taken after any of the filters. The taps 1A-nA from the first line, and taps 1B -nB from the first line are fed to tap selectors 700A and 700B respectively. The selected outputs A and B are fed to the next component as shown in FIG. 5 for example. The ratio of these outputs represents the frequency. The first taps 1A and 1B give the longest range and least sensitivity.

Figure 7:
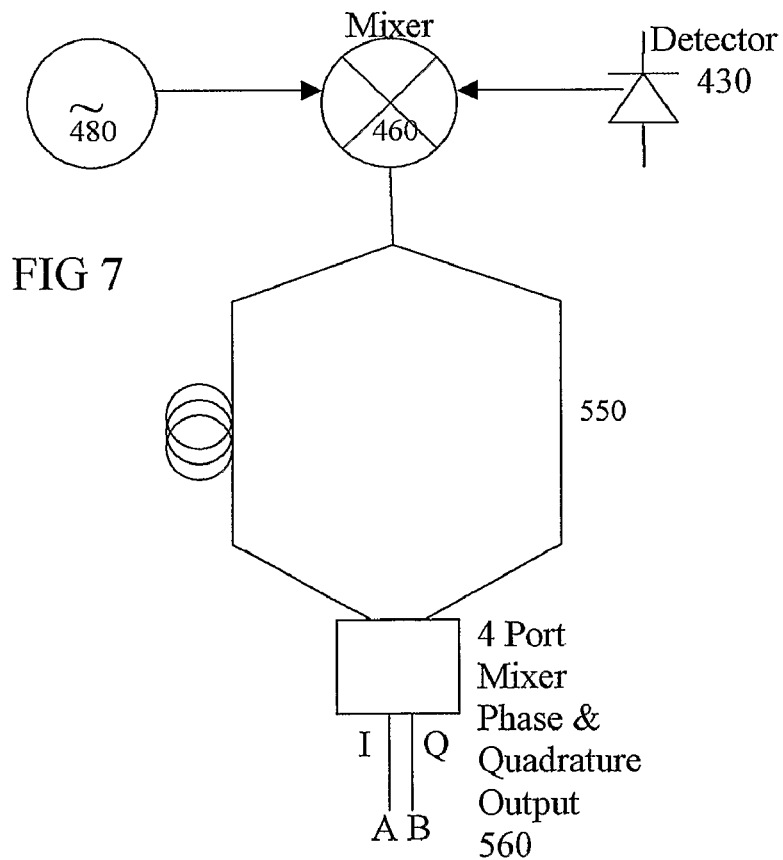
FIG. 7 shows an embodiment of an electrical domain converter using an electrical interferometer.

FIG. 7 Electrical Interferometer

FIG. 7 shows an electrical circuit for implementing the converter, instead of the diplexer shown in FIG. 5 or 6. It has a similar function to the optical interferometer embodiment shown in FIG. 4. As in FIG. 5, a coherent detector feeds an electrical signal to a mixer 460. This is an option for down converting to a lower frequency for convenience of processing. This mixer is fed by an RF oscillator 480. This can also serve the purpose of altering the offset of the frequency measurement, if the RF oscillator frequency can be varied by an offset controller 490 (not shown). The down converted signal which can be for example around 500 MHz, is fed to the electrical interferometer 550 in the form of two paths with different delays. These are recombined by a four port mixer 560 for example, so that in phase components on the two paths are added and out of phase components subtract, to achieve a similar result to optical interference. Complementary outputs A and B are provided, and the ratio indicates the relative frequency. This electrical structure results in a periodic filter, whose period is determined by the length of the path difference. The electrical interferometer could optionally include a variable path difference in the arms of the interferometer. The variable path difference would allow the period and hence roll-off of the filter to be altered. Changing the roll-off of the electrical filter created by the interferometer allows the responsitivity of the instrument to be tailored to a particular application as desired.

FIG. 8, Multiple Wavelengths

In FIG. 8, is shown an arrangement of another possible implementation of a receiver having a WDM demultiplexer. This can enable multiple measurements to be made simultaneously, if the transmitting side is arranged to send multiple pulses or signals. into the fibre at different wavelengths. This can be achieved using established techniques such as multiple lasers wavelength multiplexed to a. single modulator and EDFA for example (not illustrated). Incoming optical backscatter signals are fed to a WDM (Wavelength division multiplex) demultiplexer device 300. This is arranged to separate the various components by wavelength, These can be implemented by commonly available devices. Four separate outputs are shown, though there could be many more. The same component can achieve the separation of the Brillouin component from other components. Switchable or controllable attenuators (not shown) can be provided to attenuate the Rayleigh components if necessary to avoid damage to detectors.

Optical to electrical conversion O/E is carried out by photodetectors 320 for each wavelength. The detection can be coherent detection as described above. Analog electrical signals are passed to converters 330 for converting from frequency to amplitude, as described above with reference to FIGS. 5 to 7 for example, optionally including down converting and variable offset control. Such conversion can be carried out in the optical domain as described above, as an alternative. The electrical domain conversion may prove more cost effective if there are many channels and if the converters can be highly integrated. The outputs may include complementary A and B outputs which are fed to a digitizer and time gate 340, either before or after determining the ratio. This part outputs digital values sampled at given instants at a sampling frequency at least twice the highest frequency of the signal, and during a window of time set by the timing trigger signal sent from the transmitting side. This time gate determines how far along the sensing fibre the conditions are sensed, and can be implemented using established techniques. Digital streams of data are sent on to the buffer and /or averaging part 350 which feeds values or averaged values to the processor 360. The processor can be implemented in the form of a PC (personal computer) or other conventional hardware circuitry located locally or remotely for example. The processor outputs sensed values. It can be used to control any calibrating, and control which wavelengths are received. It can also control how much averaging is done, and control an offset and/or sensitivity of each of the channels for example.

The optical fibre may be singlemode or multimode and may have tailored doping levels, or many different doping layers, to optimise the interactions. The optical fibre may be polarisation maintaining to provide a more controlled interaction. The optical fibre may comprise lengths of different fibres to provide different scattering down the length or to change the modal characteristics of the propagating light.

The source power may be varied directly or by an attenuating or amplifying means. The filtration may be achieved using optical filters, variable optical filters, wavelength division multiplexing couplers or a combination of couplers and filters.

FIG. 9, 10, Flow Sensor

FIG. 9 shows an example of a sensing waveguide for use with the receiver embodiments described above, or with other strain sensing receivers. It shows a flow sensor in the form of a coating 810 for causing drag in a fluid flow so that the fluid flow rate is converted into strain. The waveguide is in the form of an optical fibre 800. A component of the strain will be longitudinal strain along the waveguide. This will have an effect on the Brillouin frequency which can be measured as described above. The value of strain can be converted into a flow rate value by the signal processing circuitry described above. This can involve a look up table using predetermined values, or a more complex calculation to correct for other factors. Acoustic waves propagating along the fluid can be detected as changes in flow rate. To enable the coating to cause drag, as shown, the surface is roughened or provided with protusions or ribs for example. The dimensions needed to achieve a desired amount of drag can be determined by measurements and may depend on the viscosity of the fluid for example. The induced strain will appear along the part of the fibre from the point it is induced, back to the next anchor point of the fibre. Hence if the strain is to be localised, the fibre should be fixed at frequent intervals, or continuously fixed to a structure such as the conduit of the fluid. FIG. 10 shows another example with a different coating, having a different surface profile with smoother variations in thickness to achieve the drag. Flow rate is one particularly valuable type of measurement for applications such as oil and gas production rate monitoring. A coating or other distributed sensor can be easier to implement and more rugged than alternatives such as discrete point sensors such as micro benders fitted along the waveguide. There is no need to predetermine the location of sensors. The distributed nature can give more information than point sensors, enabling tracking of anomalies as they propagate along a pipe for example, or precise detection of leaks for example.

Other Features

Further processing can be carried out to improve accuracy or resolution, such as time gating, averaging of many measurements, and correcting for temperature or loss variations. Notably there is no longer a need for a sweep of the frequency, and so measurements can be made much more quickly. In principle, the sweeping could be combined with the techniques shown, to provide very fine resolution over a much broader range. Calibration may involve a reference section of fibre, or other means, such as reference gratings at various points along the sensing fibre whose wavelength response will change with temperature and strain in predetermined ways and whose strain and temperature is known.

In principle, many variations of this arrangement can be envisaged. For example there may be multiple pulses in the fibre simultaneously if they have different wavelengths and if appropriate filters are provided at the receiver to separate the scatter from the different pulses by wavelength. Optionally an electrical output from the receiver is output to a timing gate. The backscatter from each point in the sensing fibre takes a different time to get back to the receiver. The timing of the start and end of the timing gate can be carefully referenced to the time of the launch of the respective pulse to enable only the backscatter from the desired sensing location to pass. In principle, the receiver could be arranged to measure forward scatter if the original forward going pulse can be separated. The receiver can optionally be implemented in the same unit as the transmitter, to share power supplies and processing circuitry for example. The receiver can be manufactured as a separate unit, with electrical processing parts at least integrated into a common package or hybrid part.

Note that for some applications the sensing or reference fibre can be coiled. Another application involves attaching a distributed mass to the fibre to make a multi axis distributed accelerometer.

The optical fibre may be singlemode, multimode or may be mixed singlemode and multimode for different propagating wavelengths, and may have tailored doping levels, or many different doping layers, to optimise the losses.

The optical source power may be varied to help to correct for non-linearities when deriving the temperature and strain data and to change the position, or positions, in the fibre at which the non linear effects become significant.

Some parts are not shown or are optional. For example, not shown is an attenuator for controlling the power level of the pulses. This could be implemented at various places in the optical paths, and controlled by microprocessor for example. A small part of the transmitted output pulse can be tapped off for use as a timing trigger. This can be fed to the receiving means as shown, to synchronise the timing gate in the receiving means. Optionally this could be tapped off at other places, or driven electrically from the pulse control means, but an optical tap after the optical signal components in the transmit means can be more accurate and avoid the need to account for delays in the transmit means. The optical tap can be fed back to the pulse control means to give some feedback about the output pulse timing and shape if desired, for monitoring or control purposes.

The source can be an externally modulated laser. This can be used as an alternative to directly modulated micro chip lasers for producing the pulses. To form the pulses from a continuous wave output, modulators 220 are provided, controlled by a pulse control part. Optical amplifiers can be provided at the output of the modulators for increasing the power, and actively controlling the power levels to ensure they are the same for all pulses. A pulse timing signal can be fed to the modulator, while pulse power can be controlled by any of the three components in principle.

One of, two of or all of the returning Raman Stokes, Raman anti-Stokes and Rayleigh signals may be compared to correct for any non-linearity in the signals when calculating the temperature and/or loss. Measurements from both ends of the fibre may be used to allow better calibration of the fibre. The fibre ends may be index matched and/or angle cleaved to prevent end reflections.

The optical signals are converted to electrical signals using photodetectors, photodetector arrays, avalanche photodiodes, single photon counting detectors or multi-photon counting detectors for example, and are fed into a processor and recorded in the desired form. A processor can be used to control the operation of the components of the system.

Concluding Remarks

Although described with reference to light as an example though clearly it is intended to encompass other parts of the electromagnetic spectrum having similar characteristics which enable corresponding advantages to those set out above to be achieved. Although described with reference to sensing strain and temperature, clearly it is not intended to limit to such applications, and it is conceivable to use the various aspects in other applications. This might include pressure or fibre material properties. Although described for a single ended system, it is also applicable to systems where both ends of the fibre are used for sending or receiving. Although described with reference to a sensing fibre, other waveguides can be used, provided they have equivalent scattering. Other embodiments can encompass systems using Stimulated Brillouin Scattering, using established principles.

As has been described above, an optical sensing system uses light scattered from a sensing fibre to sense conditions along the fibre, and has a receiver with a frequency to amplitude converter to obtain a frequency of a Brillouin component of the received scattered light, to deduce the conditions. This converter can avoid time consuming scanning of frequencies to obtain the Brillouin frequency spectrum, and avoids the heavy processing load of deducing a peak or average frequency from the spectrum. The converter can be implemented in the optical domain using a grating or interferometer, or in the electrical domain using a diplexer or electrical interferometer. It can generate complementary signals, having opposite signs, a ratio of these signals representing the frequency. This can avoid sensitivity to amplitude changes in the received scattered signals and provide common mode rejection of noise.

Other variations within the claims can be conceived.

The invention claimed is:

1. A receiver for an optical sensing system, the system being arranged to send light along a sensing waveguide, and use light scattered from the sensing waveguide to sense conditions, the receiver being arranged to receive the scattered light, and obtain a frequency of a Brillouin component of the received scattered light, the receiver having a frequency to amplitude converter arranged to convert a received signal directly into a signal whose amplitude varies with the instantaneous frequency of the Brillouin component, for use in sensing the conditions.

2. The receiver of claim 1, the converter being arranged to generate complementary signals, having opposite signs and output a ratio of these signals.

3. The receiver of claim 1, the converter comprising an electrical domain frequency to amplitude converter.

4. The receiver of claim 3, comprising a coherent detector for converting the received scattered light into electrical form for the electrical domain converter.

5. The receiver of claim 3, the converter comprising an electrical diplexer.

6. The receiver of claim 3, the converter comprising an electrical interferometer.

7. The receiver of claim 1, the frequency to amplitude converter comprising an optical domain frequency to amplitude converter.

8. The receiver of claim 1, the receiver having an optical filter before the converter, for separating one or more of the Brillouin components.

9. The receiver of claim 7, the converter having an optical grating arranged such that a ratio of signals reflected and passed by the grating is determined.

10. The receiver of claim 7, the converter having an interferometric device.

11. The receiver of claim 10, the interferometric device having an interferometer and a 3×coupler, the converter being arranged to compare the outputs of the coupler to obtain the frequency.

12. The receiver of claim 10, the interferometric device having a Fabry perot device.

13. The receiver of claim 1 for use with a system arranged to send light at multiple wavelengths, the receiver being arranged to receive and distinguish scattered light from the different wavelengths, and derive multiple measurements of frequency simultaneously.

14. The receiver of claim 1, for a distributed sensing system, the receiver having an arrangement for determining which part of the waveguide the scattered light originated.

15. The receiver of claim 1, having a reference section of waveguide maintained in controlled conditions, for calibrating the sensing.

16. The receiver of claim 1, having circuitry for determining an average of a number of frequency measurements.

17. The receiver of claim 1, the converter having a controllable offset.

18. A sensing system comprising a transmitter, and a receiver according to claim 1.

19. The sensing system of claim 18, comprising the sensing waveguide, the waveguide having a sensor for converting a measurand into a strain along the waveguide, the receiver being arranged to sense the strain and deduce the measurand from the strain.

20. The sensing system of claim 19, the sensor comprising a flow rate sensor being distributed along the sensing waveguide, and the receiver being arranged to sense strain and thus sense flow rate at different parts of the sensing waveguide.

21. The sensing system of claim 20, the flow rate sensor comprising a coating on the waveguide for creating drag when the waveguide is immersed in the fluid flow.

22. An optical sensing system having a transmitter, and the receiver and sensing waveguide of claim 1, the transmitter being arranged to send light along the sensing waveguide, the receiver being arranged to use light scattered from the sensing waveguide to sense strain at any part of the sensing waveguide, the sensing waveguide having a coating to cause drag in a fluid flow and cause local strain in the sensing waveguide, the receiver being arranged to sense the local strain and deduce a flow rate at different points along the sensing waveguide.

23. A method of producing sensing signals relating to conditions along a sensing waveguide, using light sent along the sensing waveguide, the method having the steps of receiving light scattered from the sensing waveguide, obtaining a frequency of a Brillouin component of the received scattered light, using a frequency to amplitude converter to convert a received signal directly into a converted signal whose amplitude varies with the instantaneous frequency of the Brillouin component, and produce the sensing signals according to the converted signal.

* * * * *